Oct. 21, 1941.  E. H. BENNETT  2,259,991
SPINDLE JAW AND BLANK COOLING APPARATUS
Filed Jan. 11, 1939  3 Sheets-Sheet 1
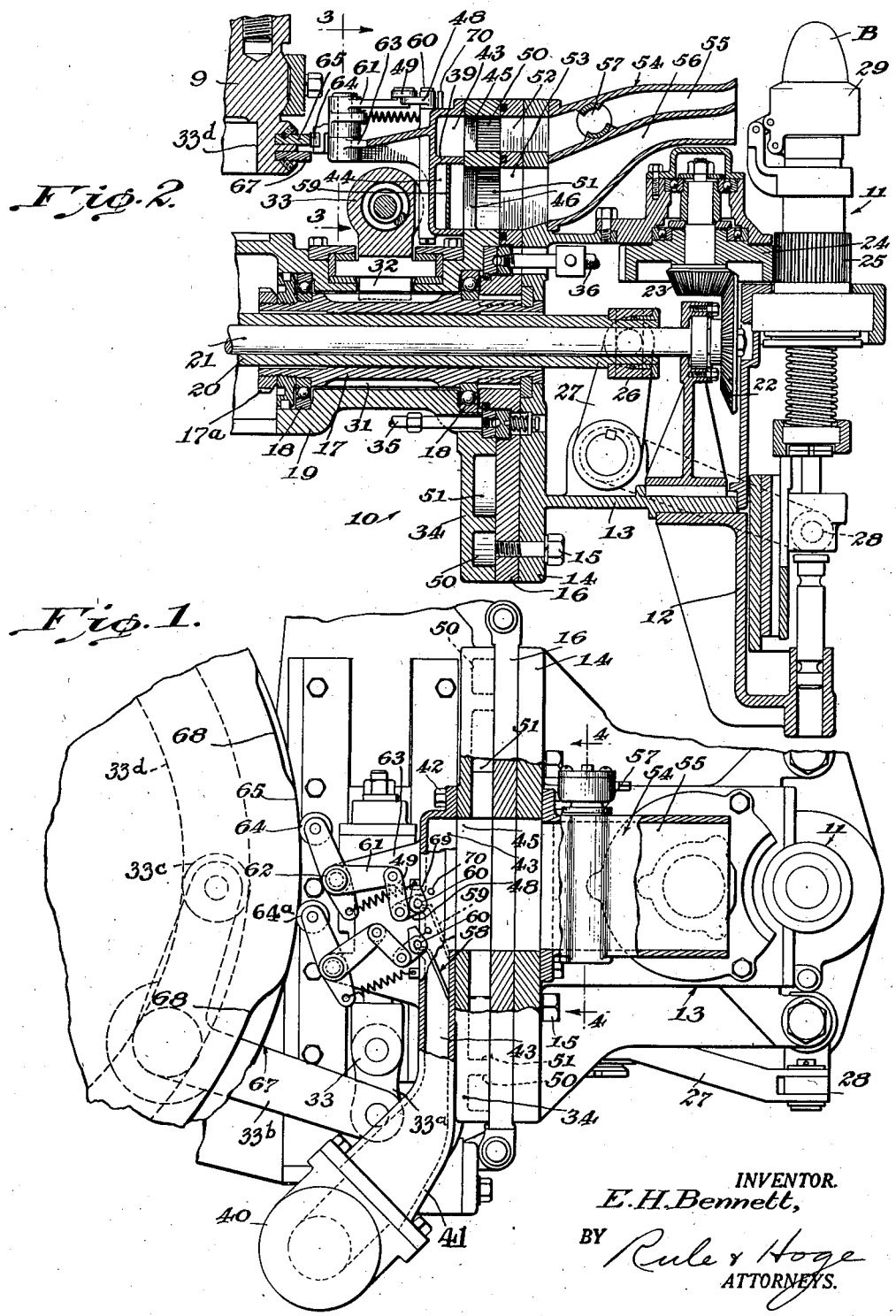
INVENTOR.
E. H. Bennett,
BY Rule & Hoge
ATTORNEYS.

Oct. 21, 1941.  E. H. BENNETT  2,259,991
SPINDLE JAW AND BLANK COOLING APPARATUS
Filed Jan. 11, 1939  3 Sheets-Sheet 2
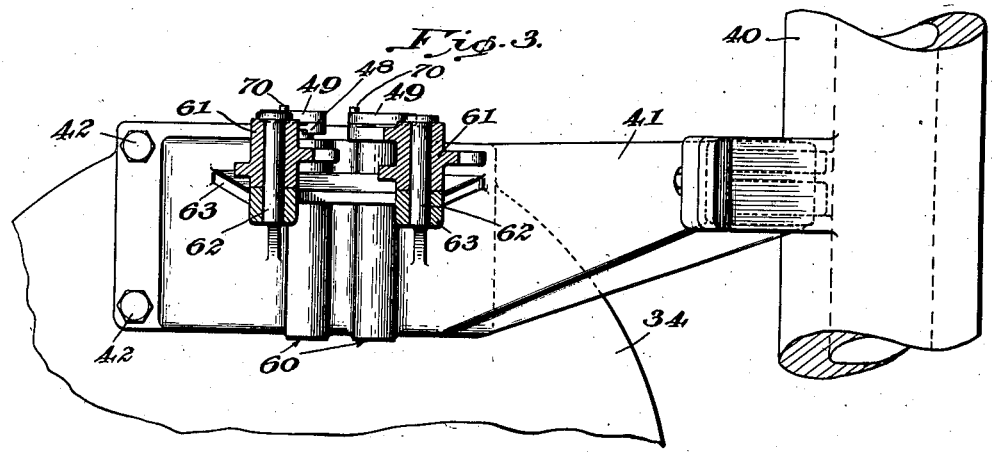
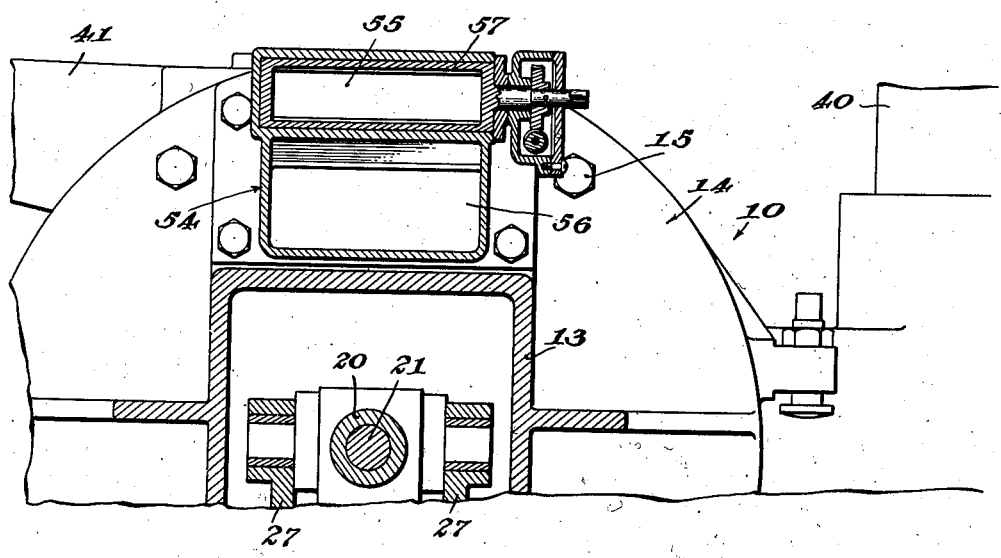
INVENTOR.
E. H. Bennett,
BY Rule & Hoge
ATTORNEYS.

Oct. 21, 1941.  E. H. BENNETT  2,259,991
SPINDLE JAW AND BLANK COOLING APPARATUS
Filed Jan. 11, 1939  3 Sheets-Sheet 3
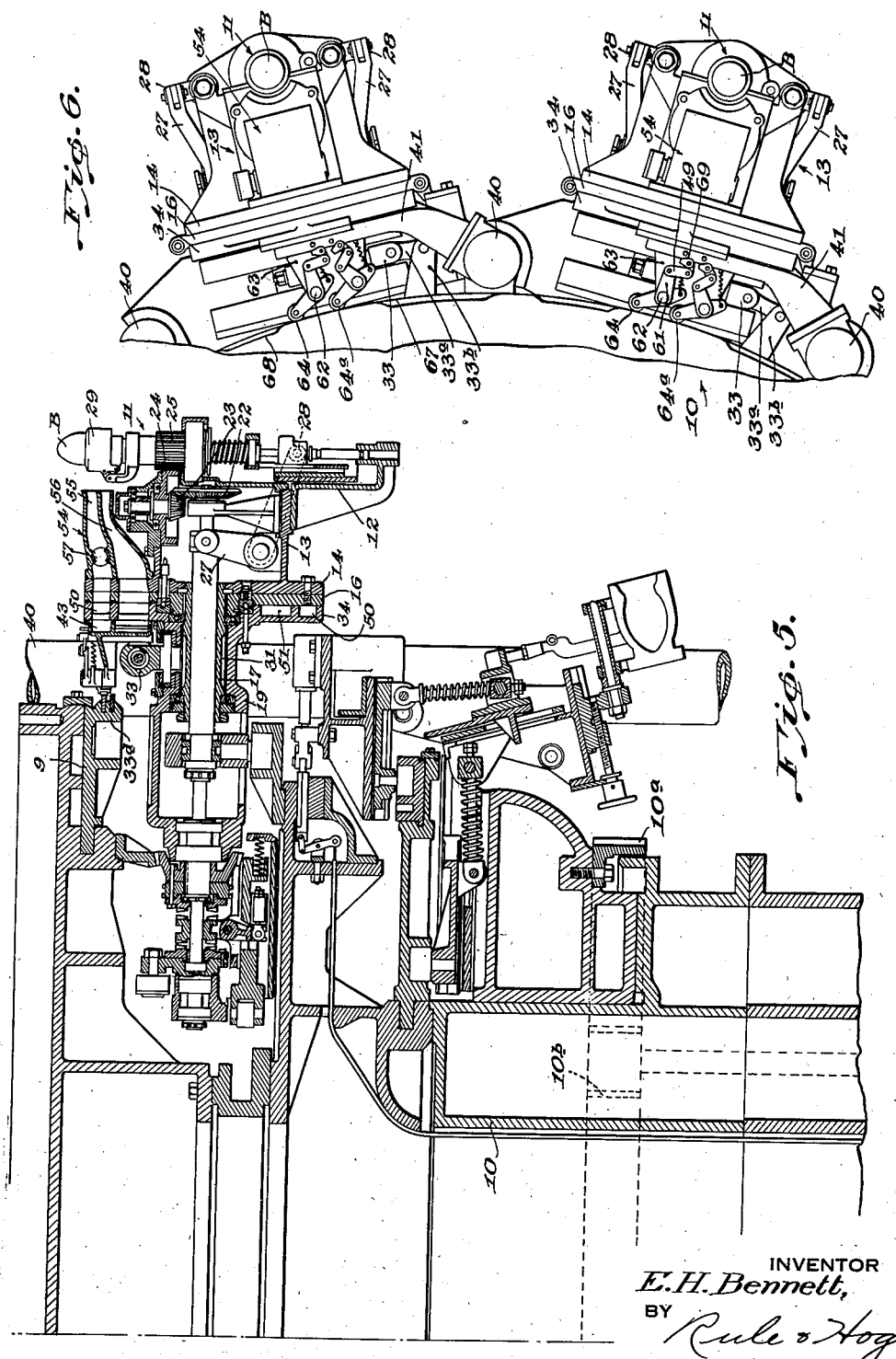
INVENTOR
*E. H. Bennett,*
BY
*Rule & Hoge*
ATTORNEYS Patented Oct. 21, 1941

2,259,991

UNITED STATES PATENT OFFICE 2,259,991

SPINDLE JAW AND BLANK COOLING APPARATUS

Edward H. Bennett, Toledo, Ohio, assignor to Libbey Glass Company, a corporation of Ohio Application January 11, 1939, Serial No. 250,430

8 Claims. (Cl. 49—40)

The present invention relates to apparatus for cooling the spindle jaws and controlling the development of the blanks positioned on the spindles of an automatic glassware forming machine during the operation thereof.

In a well known type of rotary glassware blowing machine, a gathering ram projects an inverted gathering mold into a glass furnace in contact with the surface of a pool of molten glass and by means of suction draws a charge of glass into the mold. The mold is lifted and withdrawn from the furnace, the surplus glass being cut off from the lower end of the charge and dropped back into the pool. The glass blank is then dropped onto the upper end of a spindle which is rotatable about its longitudinal axis and which may be inverted end for end. The spindle is provided with jaws for gripping the bottom end of the blank and for expanding or blowing the blank to the desired form. During the inverting operation the blank is partially developed in the open air by the application thereto of a series of puffs of air under pressure which expands the same. After the spindle and blank thereon are inverted so that the blank is suspended from the lower end of the spindle, the blank is enclosed in a blowing mold and subjected to the influence of air under pressure which together give the blank the desired form.

In machines of the type set forth above, in an effort to control the open air development of the blank, it has been customary to direct a current of cooling air against the spindle and another current of air against the partially developed blank after the spindle and blank have become inverted. This has been accomplished by the provision of a pair of relatively stationary air manifolds, one of which is located at the level which the spindle jaws assume when the spindle is inverted, and the other of which is located in a slightly lower plane so that when the spindle and partially developed blank become inverted, cooling air issuing from one manifold is directed against the jaws and cooling air issuing from the other manifold is directed against the blank. Such a construction, however, while it makes provision for cooling the blank after a certain amount of open air development thereof, fails to make provision for cooling the blank during the entire open air development thereof.

The present invention is designed as an improvement over machines of the type set forth above in that means is provided for applying cooling air to both the spindle jaws and the blank supported on the spindle during the entire period of open air development of the blank while the spindle and blank are becoming inverted. Toward these ends, the manifolds provided for the purpose of applying cooling air to the spindle jaws and blank are movable with the latter and in register therewith during the inverting of the same. Furthermore, after the spindle and blank have become inverted and tilting movement thereof has ceased, the manifolds remain relatively stationary with respect thereto in order that cooling air may continue to be applied to the spindle jaws during expansion of the blank to final form in the finishing mold. In this manner, development of the blank may be accurately controlled while at the same time adequate cooling of the spindle jaws throughout each cycle of machine operation is assured.

It is another object of the invention to provide such a machine which is extremely flexible in its operation and in which the application of blowing air to either the spindle jaws or the blank may be varied to suit the individual requirements of the machine or of the articles undergoing formation.

Other objects of the invention, not at this time enumerated, will become apparent as the nature of the same is better understood.

In the accompanying drawings:

Fig. 1 is a fragmentary top plan view, partly in section, of one mold head of a glassware forming machine embodying the principles of the present invention;

Fig. 2 is a vertical central sectional view taken through the mold head of Fig. 1;

Fig. 3 is a sectional elevational view taken substantially along the line 3—3 of Fig. 2; and Fig. 4 is a sectional elevational view taken substantially along the line 4—4 of Fig. 1.

Fig. 5 is a vertical sectional view taken through a portion of one side of a machine illustrating one of the heads and the driving mechanism for imparting motion to the rotary carriage.

Fig. 6 is a fragmentary plan view showing two of the annular series of spindles.

Referring now to the drawings and particularly to Figs. 1 and 2, a single mold head of a multiple head rotary forming machine is disclosed. The forming machine includes a central fixed frame or support 9 (Fig. 2) on which there is rotatably mounted an annular frame structure or carriage 10 carrying a plurality of spindles 11 (only one being shown for the purpose of illustration) which are positioned at spaced intervals about the circumference of the carriage. The mold carriage 10 may well be moved about its axis by means including a ring gear 10ª which meshes with a driven pinion 10ᵇ.

Each spindle supporting frame 12 is mounted at the outer end of a tiltable gear housing 13, the latter having a flange 14 which is bolted as at 15 to a circular plate 16 mounted on and splined to a hub 17. The hub 17 is mounted for oscillating movement by means of antifriction bearings 18 in a housing 19 forming a part of the carriage 10. A lock nut 17ª holds the bearing unit assembled. The frame 12, housing 13 and spindle 11 are tiltable as a unit on the carriage 10 from the upright position of the spindle 11 as illustrated, to an inverted position.

An axially shiftable sleeve 20 extends through the hub 17 and a rotatable horizontal shaft 21 is mounted within the sleeve 20. Rotary motion of the shaft 21 is transmitted through a train of gearing 22, 23, 24 and 25 to the spindle 11. The spindle 11 is axially slidable in the frame 12 in the usual manner and sliding movement thereof is controlled by axial shifting of the sleeve 20 on the shaft 21. Toward this end, the sleeve is connected at 26 to one end of a bell crank lever 27, the other end of the lever being connected to the spindle as at 28.

The upright spindle 11 is adapted to receive on the upper end thereof the blank B and is provided with a pair of jaws 29 which are clamped together over the rim or flange of the blank to securely hold the blank in position on the end of the spindle.

In order to tilt the frame 12 and invert the spindle 11, the hub 17 is formed with a series of gear teeth 31 thereon which mesh with a reciprocable rack 32, the driving mechanism for which has associated therewith a shock absorbing device 33. This rack 32 (Fig. 2) which is attached to the lower side of the shock absorbing device 33 (Figs. 1 and 2) is reciprocated by means including a link 33ª, bell crank lever 33ᵇ, and cam roll 33ᶜ which runs in a cam 33ᵈ.

The non-rotatable housing 19 is formed with a face flange 34 which abuts against the circular ring 16 and which is coaxial and substantially coextensive therewith. Blowing air for both the open air development of the blank and for expansion of the blank in the finishing mold is conducted to the spindle through a pipe 35 mounted in the relatively stationary portion of the machine and through a pipe 36 associated with the tiltable portion thereof.

The arrangement of parts thus far described is more or less conventional and no claim is made herein to any novelty associated therewith, the novelty of the present invention residing rather in the mechanism for supplying cooling air to cool the blank and the spindle jaws and which will now be more fully described.

Air designed for cooling the blank and spindle jaws is conducted upwardly through a column 40 (Figs. 1 and 3) and enters the small end of a funnel-shaped wind-box 41, bolted as at 42 to the face flange 34. A partition 39 in the wind-box 41 divides the same into two compartments 43 and 44 which register respectively with openings 45 and 46 formed in the face flange 34. The openings 45 and 46 are spaced apart radially in the face flange 34 and the outer opening 45 communicates with the circular groove or recess 50 while the inner opening 46 communicates with a groove 51 concentric with and inwardly from the former groove. Openings or passages 52 and 53 in the tiltable circular plate 16 communicate with the grooves 50 and 51 respectively and a twin manifold or nozzle 54 having inner and outer passages 56 and 55 respectively therein is secured to the plate 16 in such a manner that the passage 55 communicates with the opening 52 while the passage 56 communicates with the opening 53. The exhaust end of the passage 55 is situated directly behind the spindle jaws 29. Thus it will be seen that cooling air leaving the passages 55 and 56 of the manifold 54 will be directed against the blank and against the jaws respectively.

A manually operable damper or throttle valve 57 located in the passage 55 regulates the volume of air ejected from the latter.

Referring now to Figs. 1 and 2, means is provided for automatically controlling the passage of cooling air through the passages of the manifold 54 and toward this end, a pair of damper valves 58 and 59 are pivoted as at 60 to the wall of the wind-box 41 and are adapted to extend across the compartments 43 and 44 thereof as shown in Fig. 1 to preclude the passage of air therethrough. The valves 58 and 59 together with the mechanisms for operating the same are substantially indentical in construction and therefore a description of one will suffice for the other. The valve 59 is connected through a pair of links 48, 49 to one end of a bell crank lever 61, pivoted at 62 to a bracket 63 formed on the wind-box 41. The other end of the bell crank lever 61 carries a cam roller 64 designed for engagement with a circular cam track 65 which is mounted on and surrounds the stationary column 9 of the machine. A finger 69 formed on the link 48 is designed for engagement with a limit pin 70 to determine the maximum extent of opening of the valve 59. The cam roller 64ª which controls the operation of the valve 58 is designed for engagement with a similar cam track 67 also mounted on and surrounding the central column 9.

The cam tracks 65 and 67 are each formed with one or more recesses 68 therein which may be of sufficient depth to allow the valves 58 and 59 to become completely opened to allow cooling air to pass unobstructed through the passages 55 and 56 of the manifold 54. Alternatively, one or more of the recesses 68 may be comparatively shallow so as to effect only partial opening of either valve, the depth of the recesses being determined according to varying engineering exigencies existing in connection with the type of ware undergoing formation. Generally, however, the character and location of the recesses 68 is such that cooling air is supplied through the passage 55 of the manifold 54 to cool the blank immediately after the latter has been deposited on the upper end of the spindle and is shut off completely immediately prior to enclosure of the blank in the finishing mold. Thus cooling air is supplied to the blank during inverting of the spindle and while open air development of the blank is taking place. If desired, however, such cooling air may continue to be directed against the blank when the latter is enclosed in the finishing mold to cool the projecting neck portion thereof immediately below the jaws 29 which is exposed during the final blowing operation. Cooling air is supplied through the passage 56 to cool the jaws 29 immediately after the blank has been placed on the spindle 11 and is continued until the finished articles are discharged from the machine and immediately prior to operation of the gathering ram in the melting tank. The volume of such cooling air impinging on the jaws 29 may be varied, however, by varying the character of the recesses 68 in the upper cam track 65.

Modifications may be resorted to within the spirit and scope of the appended claims.

I claim:

1. In a rotary glassware forming apparatus, a rotatable carriage, a plurality of spindle assemblies positioned at spaced intervals on the carriage, each assembly including a frame mounted for tilting movement through a predetermined angle, a spindle carried by each frame, means at one end of each spindle for gripping and maintaining against dislodgment a glass blank, and means mounted on the frame and movable therewith during tilting movement of the latter for directing a jet of cooling air against the exterior of the blank supported on the spindle, said frame having a continuous passageway providing constant communication between a source of supply of air and the jet directing means.

2. In a rotary glassware forming apparatus, a rotatable carriage, a plurality of spindle assemblies positioned at spaced intervals on the carriage, each assembly including a frame mounted for tilting movement through a predetermined angle, a spindle carried by each frame, means at one end of each spindle for gripping and maintaining a glass blank placed upon the spindle against dislodgment, and means mounted on the frame and movable therewith during tilting movement of the latter for directing a jet of cooling air against the exterior of said gripping means and blank, said frame having a continuous passageway providing constant communication between a source of supply of air and the jet directing means.

3. In a rotary glassware forming machine, a rotatable carriage, a plurality of spindle assemblies positioned at spaced intervals on the carriage, each assembly including a frame mounted for tilting movement through a predetermined angle, a spindle carried by each frame, means at one end of each spindle for gripping and maintaining a glass blank placed upon the spindle against dislodgment, and means mounted on the frame and movable therewith during tilting movement of the latter for directing a jet of cooling air against the exterior of said gripping means and a separate jet of air against the exterior of the blank supported on the spindle, said frame having a continuous passageway providing constant communication between a source of supply of air and the jet directing means.

4. In a rotary glassware forming machine, a rotatable carriage, a plurality of spindle assemblies positioned at spaced intervals on the carriage, each assembly including a frame mounted for tilting movement through a predetermined angle, a spindle carried by each frame, means at one end of each spindle for gripping and maintaining a glass blank placed upon the spindle against dislodgment, a nozzle mounted on the frame and movable therewith during tilting movement thereof for directing a jet of air against the exterior of the blank supported on the spindle, and a throttle valve in said nozzle for controlling the volume of air so directed, said frame having a continuous passageway providing constant communication between a source of supply of air and the jet directing means.

5. In a rotary glassware forming machine, a rotatable carriage, a plurality of spindle assemblies positioned at spaced intervals on the carriage, each assembly including a frame mounted for tilting movement through a predetermined angle, a spindle carried by each frame, jaws at one end of each spindle for gripping and maintaining a glass blank placed upon the spindle against dislodgment, a nozzle mounted on the frame and movable therewith for directing a jet of cooling air against the exterior of the blank supported on the spindle, a second nozzle mounted on the frame and movable therewith for directing a jet of cooling air against the exterior of said jaws, and means for regulating the volume of air supplied by one of said nozzles, said frame having a continuous passageway providing constant communication between the nozzles and a source of supply of cooling air.

6. In a rotary glassware forming machine, a rotatable carriage, a plurality of spindle assemblies positioned at spaced intervals on the carriage, each assembly including a face flange having an annular groove formed therein, a wind-box secured to the flange and communicating with said groove, a frame mounted on the carriage for tilting movement through an angle of one hundred and eighty degrees, said frame including a plate which is substantially coextensive with the face flange, there being an opening extending through the plate in communication with the groove in all positions of the frame, and a nozzle secured to the frame and having communication with the opening.

7. In a rotary glassware forming machine, a rotatable carriage, a plurality of spindle assemblies positioned at spaced intervals on the carriage, each assembly including a face flange having a pair of concentric annular grooves therein, a wind-box secured to the face flange and communicating with each of said grooves, a frame mounted on the carriage for tilting movement through an angle of one hundred and eighty degrees, said frame including a plate which is substantially coextensive with the face flange, there being an opening extending through the plate in communication with each groove in all positions of the frame, and nozzles secured to the frame and having communication with said openings.

8. In a glassware forming machine, a rotatable carriage, a plurality of spindle assemblies positioned at spaced intervals on the carriage, each assembly including a face flange having a pair of concentric annular grooves therein, a wind-box secured to the face flange, a partition dividing the wind-box into two compartments, means establishing communication between each compartment and one of the grooves, a valve in one of the compartments for restricting the flow of air therethrough, means operable upon rotation of the carriage for opening and closing the valve at predetermined intervals, said frame including a plate which is substantially coextensive with the face flange, there being an opening extending through the plate in communication with each groove, and nozzles secured to the frame in communication with the openings.

EDWARD H. BENNETT.